(12) United States Patent
Xiang et al.

(10) Patent No.: US 8,562,126 B1
(45) Date of Patent: Oct. 22, 2013

(54) PRE-TREATMENT COMPOSITION FOR INKJET PRINTING

(75) Inventors: Yang Xiang, Dayton, OH (US); Raouf Botros, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 26 days.

(21) Appl. No.: 13/433,412

(22) Filed: Mar. 29, 2012

(51) Int. Cl.
*B41J 2/01* (2006.01)

(52) U.S. Cl.
USPC .......................................................... 347/101

(58) Field of Classification Search
USPC ............ 427/407.1, 411, 412, 209; 428/32.25, 428/32.36, 32.14, 341; 347/101, 102, 105
See application file for complete search history.

(56) References Cited

U.S. PATENT DOCUMENTS

| | | | |
|---|---|---|---|
| 4,554,181 A | 11/1985 | Cousin et al. | |
| 5,620,793 A * | 4/1997 | Suzuki et al. | 428/32.18 |
| 5,640,187 A * | 6/1997 | Kashiwazaki et al. | 347/101 |
| 6,207,258 B1 | 3/2001 | Varnell | |
| 7,041,338 B2 | 5/2006 | Nigam | |
| 7,199,182 B2 | 4/2007 | Tanaka et al. | |
| 8,025,159 B2 | 9/2011 | Kawakatsu et al. | |
| 2008/0053916 A1 | 3/2008 | Taki et al. | |
| 2008/0090949 A1 | 4/2008 | Nagao et al. | |
| 2009/0035478 A1 | 2/2009 | Zhou et al. | |
| 2011/0059272 A1 | 3/2011 | Tran et al. | |
| 2011/0279554 A1 | 11/2011 | Dannhauser et al. | |

* cited by examiner

*Primary Examiner* — Lamson Nguyen
(74) *Attorney, Agent, or Firm* — Andrew J. Anderson

(57) ABSTRACT

A coating composition for pre-treating a substrate prior to inkjet printing thereon, and an inkjet receiving medium comprising a substrate and having a topmost layer coated thereon, where the coating composition and topmost layer comprise one or more aqueous-soluble salts of multivalent metal cations, a cationic polyelectrolyte comprising amidine moieties, and one or more second polymer which is distinct from the cationic polyelectrolyte and which is selected from the group consisting of a polyamide-epichlorohydrin, a polyamine solution polymer, and a waterborne or water-dispersible polyurethane. The topmost layer is advantageously at a solid content of from 0.1 to 5 $g/m^2$, and comprises from 30-90 wt % of the one or more aqueous soluble salts of multivalent metal cations, at least 0.01 $g/m^2$ of the cationic polyelectrolyte comprising amidine moieties, and at least 0.005 $g/m^2$ of the second polymer which is distinct from the cationic polyelectrolyte comprising amidine moieties.

25 Claims, No Drawings

PRE-TREATMENT COMPOSITION FOR INKJET PRINTING

FIELD OF THE INVENTION

The invention relates to the field of inkjet printing. In particular the invention relates to a composition to be applied to a receiver to enhance the quality of inkjet prints printed with pigment-based ink, to inkjet recording media treated with such composition, and to printing systems and methods using such media.

BACKGROUND OF THE INVENTION

The present invention is directed in part to overcoming the problem of printing on glossy or semi-glossy coated papers or the like with aqueous inkjet inks. Currently available coated papers of this kind have been engineered over the years to be compatible with conventional, analog printing technologies, such as offset lithography, and may be designated as "offset papers." The printing inks used in offset printing processes are typically very high solids, and the solvents are typically non-aqueous. As a consequence, the coatings that are currently used to produce glossy and semi-glossy offset printing papers, such as those used for magazines and mail order catalogs, have been intentionally designed to be resistant to the absorption of water. In fact, when these papers are characterized by standard tests as to their porosity and/or permeability, they have been found to be much less permeable than a typical uncoated paper.

In contrast to lithographic inks, inkjet inks are characterized by low viscosity, low solids, and aqueous solvent. When such coated offset papers are printed with inkjet inks that comprise as much as 90-95% water as the carrier solvent, the inks have a tendency to sit on the surface of the coating, rather than penetrate into the coating and/or underlying paper substrate.

Because the inks printed on a water-resistant receiver must dry primarily by evaporation of the water without any significant penetration or absorption of the water into the coating or paper, a number of problems are encountered. One such problem is that the individual ink droplets slowly spread laterally across the surface of the coating, eventually touching and coalescing with adjacent ink droplets. This gives rise to a visual image quality artifact known as "coalescence" or "puddling." Another problem encountered when inks dry too slowly is that when two different color inks are printed next to each other, such as when black text is highlighted or surrounded by yellow ink, the two colors tend to bleed into one another, resulting in a defect known as "intercolor bleed." Yet another problem is that when printing at high speed, either in a sheet fed printing process, or in a roll-to-roll printing process, the printed image is not dried sufficiently before the printed image comes in contact with an unprinted surface, and ink is transferred from the printed area to the unprinted surface, resulting in "ink retransfer."

In contrast to glossy offset papers, some coated papers for offset lithography have matte surfaces that are very porous. While high-solids lithographic inks remain on the surface, the colorant of aqueous inkjet inks on the other hand tends to absorb deeply into the paper, resulting in a substantial loss of optical density and as a consequence, reduced color gamut.

Recently high speed continuous inkjet printing processes have been developed that are suitable for high speed, mid-volume printing and have become of interest to the commercial printing industry. As commercial offset papers are manufactured in high volume, it would be preferable to be able to use such offset papers themselves for commercial inkjet printing purposes, to take advantage of economies of scale. For the several reasons discussed above, however, the standard preparation of substrates for offset lithographic printing renders them unsuitable for printing with aqueous inkjet inks. Thus the need arises for inkjet-printable receivers providing the familiar look and feel as well as economical cost of standard lithographic printing-grade offset papers.

The requirements of commercial printing industry include, among others, image quality in terms of high optical density, broad color gamut, sharp detail, and minimal problems with coalescence, smearing, feathering and the like. Operationally, the printing process strives for low environmental impact, low energy consumption, fast drying, and so forth. The resulting print must exhibit durability, resisting abrasion when dry or if wetted.

Simply omitting the water-resistant coating of a glossy lithographic offset paper does not enable high-quality inkjet printing. Uncoated paper does not maintain the ink colorant at the surface, but allows significant penetration of the colorant into the interior of the paper, resulting in a loss of optical density and a low-quality image. Moreover, ink penetrates non-uniformly into the paper due to the heterogeneous nature of the paper, giving rise to mottle, which further degrades the image.

Very high quality photopapers have been developed for desktop consumer inkjet printing systems incorporating relatively high laydown ink-receiving layers that are porous and/or permeable to the ink. However, such coated photopapers are generally not suitable for high-speed commercial inkjet printing applications for a number of reasons. The thick coatings result in a basis weight that is impractically heavy for mailing or other bulk distribution means. Such receivers are not meant for rough handling or folding, which would result in cracking of the coated layers. In general, these coated photopapers are too expensive for high-speed inkjet commercial printing applications, such as magazines, brochures, catalogs, and the like. This is because such coated photopapers require either expensive materials, such as fumed oxides of silica or alumina, to produce a glossy surface or very thick coatings to adequately absorb the relatively heavy ink coverage required to print high quality photographs.

Multivalent metal salts are known to improve the print density and uniformity of images formed on plain papers from inkjet printers. For example, Cousin, et al., in U.S. Pat. No. 4,554,181, disclose the combination of a water-soluble salt of a polyvalent metal ion and a cationic polymer at a combined dry coat weight of 0.1 to 15.0 $g/m^2$, for improving the print density of images printed by inkjet printers employing anionic dye-based inks. Low coating coverages of layers comprising a polyamidine polymer composition are not disclosed.

Varnell, in U.S. Pat. No. 6,207,258, discloses the use of water-soluble salts of multivalent metal ions combined with a polymeric sizing agent and a carrier agent in a size press to improve the print density and uniformity of images formed on plain papers from inkjet printers employing pigment colorants in the ink set. The actual surface concentrations are not readily apparent from the disclosure of the size-press application method.

Tanaka, et al., in U.S. Pat. No. 7,199,182, disclose an inkjet recording material comprising an impervious substrate coated with at least 20 $g/m^2$ of an aqueous resin composition comprising a water soluble magnesium salt, an aqueous polyurethane, and one or more of a cationic compound (such as a cationic polymer), a nonionic water soluble high molecular weight compound (such as acetoacetylated poly(vinyl alcohol) (PVA acac)), and a water soluble epoxy compound.

Tran et al (US 2011/0059272) describe anti-curl compositions for inkjet receivers incorporating a water-soluble salt of a multivalent metal ion and a cationic polymer typically applied in the size press in combination with an amine oxide.

In contrast to incorporating surface modifying chemistry at the size press during paper manufacturing, treatments may also be applied as coatings on finished paper. Dannhauser et al (US 2011/0279554), e.g., describe an inkjet receiving medium including a substrate and having a topmost layer coated thereon comprising an aqueous soluble salt of a multivalent metal cation and a cross-linked hydrophilic polymer binder, for example acetoacetylated poly vinyl alcohol. Dannhauser et al further disclose a coating solution comprising calcium chloride and a dispersion, Patelacol IJ-26, believed to contain acetoacetylated PVA, a polyurethane, and a polyamide epichlorohydrin resin.

A cationic polyelectrolyte KP7000 (Dia-Natrix Co. Ltd, JP) is described as a polyamidine by Taki, et al., in US patent application publication US2008/0053916.

Nigram, in U.S. Pat. No. 7,041,338 discloses a process of providing a coated paper by utilizing a coating composition containing one or more nitrogenous dye-fixing compound, which may include a polyvinylamidine polymer or a salt thereof, and a film forming binder, where the coating composition may also include an organic or inorganic cross-linker, and where the coating composition may be applied as a pre-treatment (prior to printing), simultaneously with printing, or as an after-treatment.

Pigmented inks have many advantages over dye-based inks when they are printed on traditional paper designed for offset printing. It has been a challenge, however, to produce water resistant images with water-based pigmented inks so there will be no ink smearing when end-users turn the pages of a book with wet fingers or water is in contact with printed matter.

SUMMARY OF THE INVENTION

It is a primary objective of one embodiment of this invention to enable the printing at high speed using aqueous inkjet inks, of glossy, semi-glossy and matte coated lithographic offset papers with high image quality, high optical density, and good physical durability, including resistance to wet or dry abrasion, water-fastness, and resistance to smearing from subsequent highlighter marking.

The present invention in one embodiment provides a coating composition for pre-treating a substrate prior to inkjet printing thereon, comprising one or more aqueous-soluble salts of multivalent metal cations, a cationic polyelectrolyte comprising amidine moieties, and one or more second polymer which is distinct from the cationic polyelectrolyte and which is selected from the group consisting of a polyamide-epichlorohydrin, a polyamine solution polymer, and a waterborne or water-dispersible polyurethane, and wherein the weight ratio of water-soluble salts of multivalent metal cations to the combined weight of cationic polyelectrolyte comprising amidine moieties and second polymer is from 0.5:1 to 10:1. In one specific embodiment, the second polymer is water soluble cationic polymer, such as a polyamide-epichlorohydrin or a polyamine solution polymer. In a further embodiment, the coating solution further comprises a silanol-modified polyvinyl alcohol.

In another embodiment, the present invention provides an inkjet receiving medium comprising a substrate and having a topmost layer coated thereon, wherein the topmost layer comprises one or more aqueous soluble salts of multivalent metal cations, a cationic polyelectrolyte comprising amidine moieties, and a second polymer which is distinct from the cationic polyelectrolyte comprising amidine moieties and which is selected from the group consisting of a polyamide-epichlorohydrin, a polyamine solution polymer, and a waterborne or water-dispersible polyurethane. In a specific embodiment, the topmost layer is at a solid content of from 0.1 to 5 g/m$^2$, and comprises from 30-90 wt % of one or more aqueous soluble salts of multivalent metal cations, at least 0.01 g/m$^2$ of the cationic polyelectrolyte comprising amidine moieties, and at least 0.005 g/m$^2$ of a second polymer which is distinct from the cationic polyelectrolyte comprising amidine moieties and which is selected from the group consisting of a polyamide-epichlorohydrin, a polyamine solution polymer, and a waterborne or water-dispersible polyurethane.

Another aspect of the present invention is directed to a method of printing in which the above-described inkjet receiving medium is printed with an inkjet printer employing at least one pigment-based colorant in an aqueous ink composition, wherein the pigment-based colorant is stabilized using anionic dispersants or is self-dispersed.

In a further embodiment, the present invention provides a printing method comprising transporting an inkjet receiving medium of the invention by a continuous inkjet printhead applying an inkjet ink onto the receiving medium comprising at least one pigment based colorant in an aqueous ink composition, and subsequently transporting the printed receiving medium through a drying station.

Advantages of various embodiments of the invention include: high printed image quality including high pigment density and color gamut, and low grain and mottle; improved print durability to dry rub, wet abrasion, and highlighter marking; ability to provide all surface types including glossy, semi-glossy, and dull matte; and extremely low coverage allowing easy application and low cost.

DETAILED DESCRIPTION OF THE INVENTION

Inkjet receiving media in accordance with one embodiment of the invention comprise a substrate and have a preferably continuous topmost layer coated thereon, wherein the topmost layer comprises one or more aqueous soluble salts of multivalent metal cations, a cationic polyelectrolyte comprising amidine moieties, and a second polymer which is distinct from the cationic polyelectrolyte comprising amidine moieties and which is selected from the group consisting of a polyamide-epichlorohydrin, a polyamine solution polymer, and a waterborne or water-dispersible polyurethane. The invention further relates to a coating composition for pre-treating a substrate prior to inkjet printing thereon to form such an inkjet receiving medium, comprising one or more aqueous-soluble salts of multivalent metal cations, a cationic polyelectrolyte comprising amidine moieties, and one or more second polymer which is distinct from the cationic polyelectrolyte and which is selected from the group consisting of a polyamide-epichlorohydrin, a polyamine solution polymer, and a waterborne or water-dispersible polyurethane, wherein the weight ratio of water-soluble salts of multivalent metal cations to the combined weight of cationic polyelectrolyte comprising amidine moieties and second polymer is from 0.5:1 to 10:1, more preferably from 1:1 to 7:1. In further preferred embodiments, the weight ratio of cationic polyelectrolyte comprising amidine moieties to second polymer is from 0.1:1 to 10:1, more preferably from 0.5:1 to 5:1.

The topmost layer may preferably be coated at solid content of from 0.1 to 5 g/m$^2$, and comprises from 30-90 wt %

(more preferably from 50-90 wt %) of one or more aqueous soluble salts of multivalent metal cations, at least about 0.01 g/m$^2$ (more preferably at least about 0.05 g/m$^2$) of the cationic polyelectrolyte comprising amidine moieties, and at least about 0.005 g/m$^2$ (more preferably at least about 0.01 g/m$^2$) of the second polymer which is distinct from the cationic polyelectrolyte comprising amidine moieties and which is selected from the group consisting of a polyamide-epichlorohydrin, a polyamine solution polymer, and a waterborne or water-dispersible polyurethane. The topmost layer preferably comprises from 5-60 wt % (more preferably 5-40 wt %) of cationic polyelectrolyte comprising amidine moieties and 1-60 wt % (more preferably 1-45 wt %) of the second polymer, with the combined weight of cationic polyelectrolyte comprising amidine moieties and second polymers comprising from 10-70 wt % (more preferably 10-50 wt %) of the topmost layer.

While the topmost layer of the receiving medium of the invention is believed to improve the inkjet printing performance on a wide variety of substrates, in a particular embodiment of the invention the substrate is one of a glossy, semi-glossy or matte coated lithographic offset paper. While such coated offset papers are designed for printing primarily with non-aqueous solvent-based inks, providing a topmost layer in accordance with the present invention over such coated offset papers has been found to enable inkjet printing with high image quality including reduced mottle, high optical density, and good physical durability, including resistance to wet or dry abrasion, water-fastness, and resistance to smearing from subsequent highlighter marking. Such embodiment employing a coated offset paper as the substrate of the inkjet receiving medium of the invention thus enables advantageous inkjet receiving mediums manufactured taking advantage of economies of scale in preparation of the medium substrate.

Lithographic coated offset papers typically comprise a paper base which has been coated with clay or the like and undergone surface calendering treatment to provide a desired surface smoothness. The invention applies to the use of both glossy and matte coated offset papers. Advantageously, the relatively low coating weight of the topmost layer of the inkjet receiving medium of the invention helps maintain the relative glossy or matte surface of the employed substrate. Such coated offset papers employable as the substrate of the inkjet receiving medium of the invention may be obtained from various commercial paper manufacturers, including, e.g., International Paper, Sappi, New Page, Appleton Coated, Abitibi-Bowater, Mohawk Papers, Verso, Mitsubishi, Norpac, Domtar, and many others. Specific examples include, e.g., STERLING ULTRA GLOSS paper (80 lb basis weight), a coated glossy offset paper for lithographic printing manufactured by NewPage, and UTOPIA BOOK (45 lb. basis weight), available from Appleton Coated, a coated matte offset paper.

In various embodiments, the substrate can be readily hydrophilic and capable of adsorbing and transferring ink colorant to the substrate interior prior to being coated thereon with the topmost layer of the invention, such as wherein the substrate may be porous. Alternatively, the substrate can be substantially impermeable to water or aqueous ink, such as a non-porous plastic film. In a particular preferred embodiment, the invention is particularly useful wherein the substrate comprises a relatively hydrophobic coated surface prior to being coated thereon with the topmost layer, and the topmost layer provides a continuous relatively hydrophilic surface.

While the invention is in certain embodiments directed towards the use of coated offset papers as the substrate, the topmost layer of the invention may also be used in combination with uncoated offset paper or other plain papers. Further, the invention may also be used with any of those supports usually used for inkjet receivers, such as resin-coated paper, polyesters, or microporous materials such as polyethylene polymer-containing material sold by PPG Industries, Inc., Pittsburgh, Pa. under the trade name of TESLIN, TYVEK synthetic paper (DuPont Corp.), and OPPALYTE films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates.

Biaxially oriented support laminates are described in U.S. Pat. Nos. 5,853,965, 5,866,282, 5,874,205, 5,888,643, 5,888,681, 5,888,683, and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The kind of paper supports listed above include a broad range of papers, from high end papers, such as photographic paper to low end papers, such as the kind used for newsprint. In a preferred embodiment, commercial offset-grade coated paper is used.

The topmost coating composition may be applied to both sides of the substrate, or alternatively to only one side. The method employed to accomplish this can be selected from a number of known techniques, including but not limited to spraying, rod coating, blade coating, gravure coating (direct, reverse, and offset), flexographic coating, size press (puddle and metered), extrusion hopper coating, and curtain-coating. After drying, the resulting topmost layer can be calendered to improve gloss.

In one embodiment, in which paper is used as the support, the topmost layer can be applied in line as part of the paper manufacturing process. In another embodiment, the topmost layer may be coated as a separate coating step subsequent to the paper (or other substrate) manufacture. In a particular embodiment, the topmost layer may be applied inline as part of the inkjet printing operation, wherein such layer is applied to a substrate in a pre-coating station prior to printing of inkjet inks. Such inline application may be performed by the various coating processes identified above, or alternatively by a printhead positioned inline with the ink-applying printheads. When a printhead is used to apply the coating solution, the option exists of covering only the printed image area with the coating material, rather than the entire area of the substrate. Pre-coat application provides the advantage of eliminating color-to-color bleed during imaging, since the colorants of the ink are fixed instantaneously as the ink contacts the pre-coated substrate. Furthermore, with pre-coating, images appear darker and have sharper edge definition, since the coating minimizes ink penetration and allows more fixed colorant on the surface. Finally, while the pre-coat material may optionally be dried completely before image printing, complete drying of the pre-coated substrate may not be necessary. Therefore, drying can alternatively be applied once after imaging, resulting in considerable savings in energy.

The topmost layer of the inkjet receiving medium of the invention includes an aqueous-soluble salt of a multivalent metal. Aqueous-soluble is herein defined as at least 0.5 g of the salt capable of dissolving in 100 ml water at 20° C. The salt is preferably essentially colorless and non-reactive. More preferably, the multivalent metal is a cation selected from $Mg^{+2}$, $Ca^{+2}$, $Ba^{+2}$, $Zn^{+2}$, and $Al^{+3}$, most preferably $Ca^{+2}$ or $Mg^{+2}$ in combination with suitable counter ions.

Examples of the salt used in the invention include (but are not limited to) calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Similar salts will be appreciated by the skilled artisan. Particularly preferred salts are $CaCl_2$, $Ca(CH_3CO_2)_2$, $MgCl_2$, $Mg(CH_3CO_2)_2$, $Ca(NO_3)_2$, or $Mg(NO_3)_2$, including hydrated versions of these salts. Combinations of the salts described above may also be used. The topmost layer preferably comprises calcium ion equivalent to at least 0.05 g/m² of calcium chloride, more preferably equivalent to at least 0.1 g/m² of calcium chloride.

The topmost layer of the receiving medium of the invention further includes a cationic polyelectrolyte comprising amidine moieties. Such cationic polyelectrolyte polymers may also conventionally be referred to as polyamidine or polyvinylamidine polymers, and are cationic macromolecules having the structural unit shown by the general formula [1]:

Formula [1]

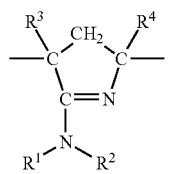

wherein R1 to R4 represent hydrogen atom of an alkyl group such as methyl group. The cationic macromolecule having the structural unit represented by general formula [1] can be prepared by copolymerization of acrylonitrile or methacrylonitrile with N-vinyl-carboxylic acid amine, N-isopropenyl-carboxylic acid amide, N-vinylcarboxylic acid amide or N-isopropenylcarboxylic acid amide, followed by hydrolysis of the obtained copolymer to obtain an amidine. There is the possibility that the polyvinylamidine prepared as described above has additional units comprising, e.g., a cyano group derived from acrylonitrile or the like, carbamoyl group formed by hydrolysis of cyano group, and amino group formed by hydrolysis of N-vinylcarboxylic acid amide unit or the like in addition to the structural unit represented by general formula [1]. DIAFLOC KP7000 manufactured by DIA-NITRIX Company is an example of polyvinylamidine cationic polymer available as a commercial product, which is reported to have the following structure:

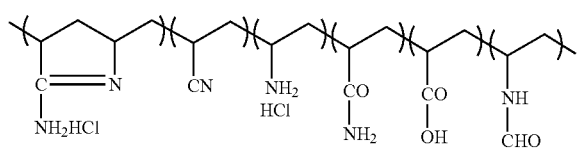

Polyvinyl Amidine

The topmost layer of the receiving medium of the invention further includes one or more second polymer which is distinct from the cationic polyelectrolyte comprising amidine moieties and which is selected from the group consisting of a polyamide-epichlorohydrin, a polyamine solution polymer, and a waterborne or water-dispersible polyurethane.

Polyamide-epichlorohydrin polymers are water soluble cationic polymers. A representative example of a polyamide-epichlorohydrin polymer which may be used in the present invention is POLYCUP 172, available from Hercules, Inc., which is of the formula:

POLYCUP 172 (Polyamide-Epichlorohydrin)

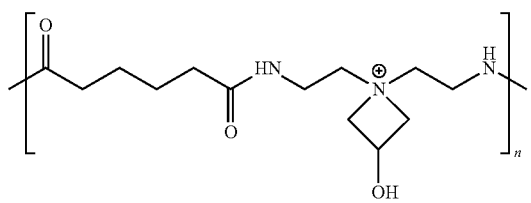

Polyamine solution polymers are water soluble cationic polymers. A representative example of a polyamine solution polymer which may be used in the present invention is CATIOFAST 159(A), available from the BASF company, which is of the formula:

CATIOFAST 159 (A) (Polyamine Solution Polymer)

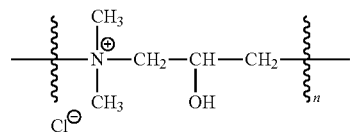

Waterborne polyurethanes are dispersions of fine polyurethane particles in aqueous medium. Such polymer particles may be of self-dispersable sizes and compositions, or otherwise be treated with additional dispersing agents to be made dispersible. A representative example of a waterborne polyurethane polymer which may be used in the present invention is PRINTRITE DP-376, available from Lubrizol, which is described by the manufacturer as an all aliphatic waterborne polymer dispersion useful in textile, nonwoven, and paper applications, and as a primer on various substrates used for aqueous inkjet printing receivers to improve hydrophilic character.

The topmost layer of the receiving medium of the invention may include additional polymer binders in addition to those specified above. In a further particular embodiment, e.g., a silanol-modified polyvinyl alcohol polymer may additionally be employed. A representative example of a silanol-modified polyvinyl alcohol polymer which may be used in such further embodiment is POVAL R-1130, available from Kuraray Co., which is of the formula:

POVAL R-1130

Silanol-Modified Polyvinyl Alcohol

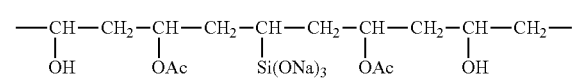

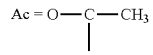

To provide desired abrasion resistance and cohesiveness, the topmost layer preferably comprises at least 0.05 g/m² of the combined weight of the cationic polyelectrolyte comprising amidine moieties and the one or more second polymer selected from the group consisting of a polyamide-epichlorohydrin, a polyamine solution polymer, and a waterborne or water-dispersible polyurethane. In accordance with further preferred embodiments of the invention, the topmost layer is coated on the substrate at solid content of from 0.1 to 5 g/m², preferably from 0.1 to 3 g/m², more preferably from 0.2 to 2 g/m², and most preferably from 0.3 to 1.5 g/m², and such layer comprises from 30-90 wt %, more preferably 50-90 wt %, of one or more aqueous soluble salts of multivalent metal cations. Such combination of relatively low total solid laydown and relatively high multivalent metal salt concentration in a topmost coating composition, along with use of the specified combination of polymers, surprisingly has been found to enable improved inkjet printing performance when printing pigment-based aqueous inks on a variety of substrates, including coated offset papers as discussed above.

The topmost layer coating formulation may further comprise additional optional components, such as inorganic or organic particles, though it is preferred that the coating solid laydown and relative concentration preferences of the invention still be met. These can include, but are not limited to, kaolin clay, montmorillonite clay, delaminated kaolin clay, calcium carbonate, calcined clay, silica gel, fumed silica, colloidal silica, talc, wollastinite, fumed alumina, colloidal alumina, titanium dioxide, zeolites, or organic polymeric particles such as Dow HS3000NA.

Another aspect of the invention is directed to a method of printing in which the above-described receiver is printed with an inkjet printer employing at least one pigment-based colorant in an aqueous ink composition. Preferably, the pigment-based colorants are stabilized using anionic dispersants. Such dispersants can be polymeric, containing repeating sub-units, or may be monomeric in nature. The present invention is particularly advantageous for printing periodicals, newspapers, magazines, and the like. The printing method may employ a continuous high-speed commercial inkjet printer, for example, in which the printer applies colored images from at least two different print heads, preferably full-width printheads with respect to the media, in sequence in which the different colored parts of the images are registered.

One type of printing technology, commonly referred to as "continuous stream" or "continuous" inkjet printing, uses a pressurized ink source that produces a continuous stream of ink droplets. Conventional continuous inkjet printers utilize electrostatic charging devices that are placed close to the point where a filament of working fluid breaks into individual ink droplets. The ink droplets are electrically charged and then directed to an appropriate location by deflection electrodes having a large potential difference. When no print is desired, the ink droplets are deflected into an ink-capturing mechanism (catcher, interceptor, gutter, etc.) and either recycled or disposed of. When print is desired, the ink droplets are not deflected and allowed to strike a print medium. Alternatively, deflected ink droplets may be allowed to strike the print media, while non-deflected ink droplets are collected in the ink capturing mechanism.

Typically, continuous inkjet printing devices are faster than droplet on demand devices and produce higher quality printed images and graphics. However, each color printed requires an individual droplet formation, deflection, and capturing system. Such continuous inkjet printing devices employ a high-speed inkjet receiving medium transport system capable of transporting at least one of roll-fed or sheet fed receiving medium, in combination with a continuous inkjet printhead for image-wise printing of inkjet ink onto the receiving medium and a drying station for drying of the printed image. Use of a topmost layer in accordance with the present invention in such a high speed continuous inkjet printing device advantageously enables an aqueous pigment-based printed inkjet image to be initially stabilized upon the surface of the receiving medium until the printed image can be dried in the device drying station to result in improved image quality, especially when printing on substrates comprising relatively hydrophobic coated offset papers or aqueous ink impermeable plastic films.

Examples of conventional continuous inkjet printers include U.S. Pat. No. 1,941,001 issued to Hansell on Dec. 26, 1933; U.S. Pat. No. 3,373,437 issued to Sweet et al. on Mar. 12, 1968; U.S. Pat. No. 3,416,153 issued to Hertz et al. on Oct. 6, 1963; U.S. Pat. No. 3,878,519 issued to Eaton on Apr. 15, 1975; and U.S. Pat. No. 4,346,387 issued to Hertz on Aug. 24, 1982.

A more recent development in continuous stream inkjet printing technology is disclosed in U.S. Pat. No. 6,554,410 to Jeanmaire, et al. The apparatus includes an ink-drop-forming mechanism operable to selectively create a stream of ink droplets having a plurality of volumes. Additionally, a droplet deflector having a gas source is positioned at an angle with respect to the stream of ink droplets and is operable to interact with the stream of droplets in order to separate droplets having one volume from ink droplets having other volumes. One stream of ink droplets is directed to strike a print medium and the other is directed to an ink catcher mechanism.

The colorant systems of the ink jet ink compositions employed in accordance with one embodiment of the invention may be dye-based, pigment-based or combinations of dye and pigment. Compositions incorporating pigment are particularly useful. Pigment-based ink compositions are used because such inks render printed images having higher optical densities and better resistance to light and ozone as compared to printed images made from other types of colorants. A wide variety of organic and inorganic pigments, alone or in combination with additional pigments or dyes, can be in the present invention. Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. In accordance with one embodiment of the invention, colorants comprising cyan, magenta, or yellow pigments are specifically employed. The pigment particles useful in the invention may have any particle sizes which can be jetted through a print head. Preferably, the pigment particles have a mean particle size of less than about 0.5 micron, more preferably less than about 0.2 micron.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann, et al., in U.S. Pat. No. 6,758,891 B2 and U.S. Pat. No. 6,660,075 B2, Belmont in U.S. Pat. No. 5,554,739, Adams and Belmont in U.S. Pat. No. 5,707,432, Johnson and Belmont in U.S. Pat. Nos. 5,803,959 and 5,922,118, Johnson et al in and U.S. Pat. No. 5,837,045, Yu et al in U.S. Pat. No. 6,494,943 B1, and in published applications WO 96/18695, WO 96/18696, WO 96/18689, WO 99/51690, WO 00/05313, and WO 01/51566, Osumi et al., in U.S. Pat. No. 6,280,513 B1 and U.S. Pat. No. 6,506,239 B1, Karl, et al., in U.S. Pat. No. 6,503,311 B1, Yeh, et al., in U.S. Pat. No. 6,852,156 B2, Ito et al., in U.S. Pat. No. 6,488,753 B1 and Momose et al., in EP 1,479,732 A1.

Pigment-based ink compositions employing non-self-dispersed pigments that are useful in the invention may be prepared by any method known in the art of inkjet printing. Dispersants suitable for use in the invention in preparing stable pigment dispersions include, but are not limited to, those commonly used in the art of inkjet printing. For aqueous pigment-based ink compositions, particularly useful dispersants include anionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017.

Polymeric dispersants are also known and useful in aqueous pigment-based ink compositions. Polymeric dispersants include polymers such as homopolymers and copolymers; anionic, cationic or nonionic polymers; or random, block, branched or graft polymers. The copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. Polymer stabilized pigment dispersions have the additional advantage of offering image durability once the inks are dried down on the ink receiver substrate.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1 and US 2007/0043144 A1, the disclosures of which are incorporated herein by reference.

Inkjet inks printed onto inkjet receiving media in accordance with the invention may contain further addendum as is conventional in the inkjet printing art. Polymeric dispersed pigment-based aqueous inkjet ink formulations suitable for use in particular embodiments of the present invention include those described, e.g., in U.S. Patent Publication Nos. US2011/0123714, US2011/0122180, US2010/0302292, and US2010/0304028, the disclosures of which are incorporated by reference herein in their entireties.

EXAMPLES

Pretreatment coating compositions were tested on a glossy coated paper Sterling Ultragloss (80 lb basis weight). As received from the manufacturer, the receiver is already coated with a coating designed for conventional offset printing. Samples of Sterling Ultragloss were treated with aqueous compositions applied by No. 2.5 wired rod and were dried with a hot-air gun to provide a dry weight coverage of approximately 0.5 $g/m^2$. The coated samples were then printed with polymeric anionic dispersant dispersed pigment-based KODAK PROSPER Inks with a No. 2.5 wired rod. Printed samples were evaluated for image durability by dry rub and wet rub evaluation procedures.

The dry rub test is performed as follows: A. Load the test sample onto the bottom foam plate of a Sutherland rub tester. B. Load a 4 lb weighted arm with unused Data Speed Laser MOCR paper (manufactured by International Paper) making sure the paper is taut over the foam section. C. Attach the 4 lb weighted arm to the tester. Adjust the dial on the tester to 10 strokes. D. Press the "Start" button. Remove the sample and color loss and staining are evaluated by measuring optical density change before and after test. The results were rated as follows:

Very Poor: above 30% ink removed from printed area
Poor: 21% to 30% ink removed from printed area
Moderate: 16% to 20% ink removed from printed area
Good: 11% to 15% ink removed from printed area
Very Good: 10% or less ink removed from printed area The wet rub test is performed as follows: The wet rub test is performed by placing a drop of water on the printed substrate which was previously coated with one of the coating fluids demonstrated in Table 1. The water drop is left twenty seconds on the printed area before it is rubbed with finger ten times. Loss of color in the drop area and color smear in the unprinted area are evaluated by measuring optical density change before and after test. The results were rated as follow:

Very Poor: complete ink removal in the drop and complete transfer of color to the unprinted area
Poor: 50% or more color removal from printed area
Moderate: 30% to 49% color removed from printed area
Good: 11% to 29% color removed from printed area
Very Good: 10% or less color removal from printed area Treated samples were also printed on Kodak ESP7 All-in-One printer for checking image quality (IQ) (graininess, mottle, line raggedness, and color-to-color bleeding). The results were rated as follow:

Poor: severe mottle and graininess, poor line raggedness and color-to-color bleeding'
Moderate: observable mottle or graininess, noticeable line raggedness and color-to-color bleeding
Good: no observable mottle and graininess, good line raggedness, and slight color-to color bleeding
Very good: no observable mottle and graininess, sharp color-to-color definition Sample coating compositions were made up in water as detailed in Table 1, with components indicated as weight percentages of coating solution.

TABLE 1

Coating compositions

| # | $CaCl_2$ | KP-7000 | Other Polymers | Dry Rub | Wet Rub | Image Quality | |
|---|---|---|---|---|---|---|---|
| 1 | 7% | 1% | | Poor | Moderate | Good | Comp |
| 2 | 7% | 3% | | Very Poor | Poor | Moderate | Comp |
| 3 | 7% | 1% | CatioFast 159(A) 2% | Good | Very Good | Good | Inv |

TABLE 1-continued

Coating compositions

| # | CaCl$_2$ | KP-7000 | Other Polymers | Dry Rub | Wet Rub | Image Quality | |
|---|---|---|---|---|---|---|---|
| 4 | 7% | — | CatioFast 159(A) 2% | Poor | Moderate | Good | Comp |
| 5 | 7% | 1% | 0.24% Polycup 172; 0.9% Poval R-1130 | Very Good | Very Good | Very Good | Inv |
| 6 | 7% | — | 0.68% Polycup 172; 4% Poval R-1130 | Good | Poor | Very Good | Comp |
| 7 | 7% | 1.8% | 0.36% Polycup 172 | Moderate | Moderate | Moderate | Inv |
| 8 | 7% | 1.22% | 0.56% Printrite 376 | Good | Good | Good | Inv |
| 9 | 7% | — | 2% Printrite 376 | Poor | Poor | Good | Comp |
| 10 | — | — | — | Moderate | Moderate | Poor | Comp |
| 11 | 7% | — | — | Very Poor | Very Poor | Good | Comp |

KP-7000: polyamidine-based polymer
POLYCUP 172: polyamide-epichlorohydrin
CATIOFAST 159A: polyamine solution polymer
POVAL R-1130: silanol-modified polyvinyl alcohol (PVA)
PRINTRITE 376: waterborne aliphatic polyurethane dispersion Untreated, the Sterling Ultra Gloss (SUG) substrate (Example 10, Table 1) provided moderate wet rub and dry rub durability, but very poor image quality when printed with a set of aqueous, pigment-based inkjet inks sold as KODAK PROSPER inks. Treating the SUG with a comparative aqueous coating solution of CaCl$_2$ salt alone provided good image quality (IQ) on the glossy substrate (SUG). However, wet rub and dry rub resistance were rated very poor (Example 11).

While the present invention is not bound by any particular theory, the present inventors suspect that the action of the multivalent cation may be to "crash" the dispersed ink pigments at the surface of the receiver. While providing higher density, the pigment at the surface is subject to durability issues such as wet and dry rub. A comparative aqueous coating fluid comprising 1% of a polyamidine cationic polymer (KP-7000), in addition to the CaCl$_2$ slightly enhanced durability but the dry rub remained poor (Example 1). Surprisingly, when the amount of KP-7000 was increased to 3% in another comparative coating solution (Example 2), durability became worse.

A further comparative coating solution, comprising 2% Catiofast 159(A), a cationic polyamine polymer and CaCl$_2$ (Example 4) produced poor to moderate durability on the glossy substrate (SUG). In example 3, a coating solution according to the present invention comprising 1% KP-7000 in addition to the components of the comparative coating solution of Example 4, provided a coated substrate with good to very good durability while maintaining good image quality. The combination of a polyamidine with a second cationic polymer provided an unexpected improvement compared to the substrates coated with CaCl$_2$ and only a single polymer as illustrated in Examples 1 and 4.

The synergy effect of a coating solution according to the present invention comprising CaCl$_2$, KP-7000 and another cationic water-soluble polymer, Polycup 172, a polyamide-epichlorohydrin polymer is demonstrated in Example 7 where durability and IQ were rated moderate. Comparative example 1 demonstrated poor dry rub performance and comparative example 6 showed poor wet rub performance.

Another synergy effect is shown in Example 8, wherein a coating solution according to the present invention comprising KP-7000 and Printrite DP-376, a polyurethane polymer in addition to CaCl$_2$, provided durability and IQ rated good across the board, in contrast to the comparative coating solutions comprising only the individual polymers in Examples 1, 2 and 9, wherein the durability was rated very poor to moderate.

The synergy effect of a coating solution according to the present invention comprising CaCl$_2$, KP-7000, Poval R-1130, a silanol-modified PVA and Polycup 172, a polyamide-epichlorohydrin polymer, is demonstrated in Example 5 where durability and IQ were rated very good which is better than the individual polymers illustrated in Examples 1 and 6.

Coated glossy and matte papers were further tested with coating compositions of the invention from bench draw down to coating with in-line coater and printing with a commercial high speed four-color CIJ inkjet press. Prints on pre-treated papers in such further tests similarly showed excellent water resistance measured with wet finger rub test, dry rub resistance, scratch resistance, and image quality.

The invention has been described in detail with particular reference to certain preferred embodiments thereof, but it will be understood that variations and modifications can be effected within the spirit and scope of the invention.

The invention claimed is:

1. An inkjet receiving medium comprising a substrate and having a topmost layer coated thereon, wherein the topmost layer comprises one or more aqueous soluble salts of multivalent metal cations, a cationic polyelectrolyte comprising amidine moieties, and a second polymer which is distinct from the cationic polyelectrolyte comprising amidine moieties and which is selected from the group consisting of a polyamide-epichlorohydrin, a polyamine solution polymer, and a waterborne or water dispersible polyurethane.

2. An inkjet receiving medium of claim 1, wherein the topmost layer coated thereon is at a solids content of from 0.1 to 5 g/m$^2$, and comprises from 30-90 wt % of the one or more aqueous soluble salts of multivalent metal cations, at least 0.01 g/m$^2$ of the cationic polyelectrolyte comprising amidine moieties, and at least 0.005 g/m$^2$ of the second polymer which is distinct from the cationic polyelectrolyte comprising amidine moieties and which is selected from the group consisting of a polyamide-epichlorohydrin, a polyamine solution polymer, and a waterborne or water dispersible polyurethane.

3. The inkjet receiving media of claim 2, wherein the topmost layer comprises from 5-60 wt % of cationic polyelectrolyte comprising amidine moieties and 1-60 wt % of the second polymer.

4. The inkjet receiving media of claim 3, wherein the topmost layer comprises from 50-90 wt % of the aqueous soluble salts of multivalent metal cations, from 5-40 wt % of cationic polyelectrolyte comprising amidine moieties, and 1-45 wt % of the second polymer.

5. The inkjet receiving media of claim 4, wherein the one or more multivalent metal salts comprise a calcium salt.

6. The inkjet receiving media of claim 5, wherein the topmost layer comprises calcium ion equivalent to at least 0.10 g/m$^2$ of calcium chloride.

7. The inkjet receiving media of claim 2, wherein the topmost layer is coated at a solid content of from 0.1 to 3 g/m$^2$.

8. The inkjet receiving media of claim 2, wherein the topmost layer is coated at a solid content of from 0.2 to 2 g/m$^2$.

9. The inkjet receiving media of claim 2, wherein the topmost layer is coated at a solid content of from 0.3 to 1.5 g/m$^2$.

10. The inkjet receiving media of claim 2, wherein the substrate is hydrophilic and capable of adsorbing and transferring an aqueous ink colorant to the substrate interior prior to being coated thereon with the topmost layer.

11. The inkjet receiving media of claim 2, wherein the substrate comprises a relatively hydrophobic surface prior to being coated thereon with the topmost layer, and the topmost continuous layer provides a continuous relatively hydrophilic surface in comparison to the relatively hydrophobic substrate surface prior to being coated.

12. The inkjet receiving media of claim 2, wherein the substrate is a coated offset paper.

13. The inkjet receiving medium of claim 2, wherein the second polymer is a polyamide-epichlorohydrin.

14. The inkjet receiving medium of claim 13, further comprising a silanol-modified polyvinyl alcohol.

15. The inkjet receiving medium of claim 2, wherein the second polymer is a polyamine solution polymer.

16. The inkjet receiving medium of claim 2, wherein the second polymer is a waterborne or water dispersible polyurethane.

17. The inkjet receiving media of claim 2, wherein the one or more multivalent metal salts comprises a cation selected from $Mg^{+2}$, $Ca^{+2}$, $Ba^{+2}$, $Zn^{+2}$, and $Al^{+3}$.

18. The inkjet receiving media of claim 2, wherein the one or more multivalent metal salts comprise $CaCl_2$, $Ca(CH_3CO_2)_2$, $MgCl_2$, $Mg(CH_3CO_2)_2$, $Ca(NO_3)_2$, or $Mg(NO_3)_2$, or hydrated versions of these salts.

19. A method of printing in which the inkjet receiving media of claim 2 is printed with an inkjet printer employing at least one pigment-based colorant in an aqueous ink composition wherein the pigment-based colorant is stabilized using anionic dispersants or is self-dispersed.

20. The method of claim 19, comprising transporting the inkjet receiving media by a continuous inkjet printhead applying the ink composition onto the receiving medium, and subsequently transporting the printed receiving medium through a drying station.

21. The printing method of claim 20 in which the inkjet printer is a continuous high-speed commercial inkjet printer and the inkjet printer applies colors from at least two different print heads in sequence in which different colored parts of an image printed on the inkjet-receiving medium are registered.

22. A coating composition for pre-treating a substrate prior to inkjet printing thereon, comprising one or more aqueous-soluble salts of multivalent metal cations, a cationic polyelectrolyte comprising amidine moieties, and one or more second polymer which is distinct from the cationic polyelectrolyte and which is selected from the group consisting of a polyamide-epichlorohydrin, a polyamine solution polymer, and a waterborne or water-dispersible polyurethane, and wherein the weight ratio of water-soluble salts of multivalent metal cations to the combined weight of cationic polyelectrolyte comprising amidine moieties and second polymer is from 0.5:1 to 10:1.

23. A coating composition according to claim 22, wherein the weight ratio of water-soluble salts of multivalent metal cations to the combined weight of cationic polyelectrolyte comprising amidine moieties and second polymer is from 1:1 to 7:1.

24. A coating composition according to claim 22, wherein the weight ratio of cationic polyelectrolyte comprising amidine moieties to second polymer is from 0.1:1 to 10:1.

25. A coating composition according to claim 22, wherein the one or more multivalent metal salts comprises a calcium salt.

* * * * *